May 10, 1927.

C. C. BALSTON 1,627,722

PHOTOGRAPHIC CAMERA

Original Filed Nov. 9, 1917    8 Sheets-Sheet 1

Inventor
Clyde C. Balston,
by his atty.

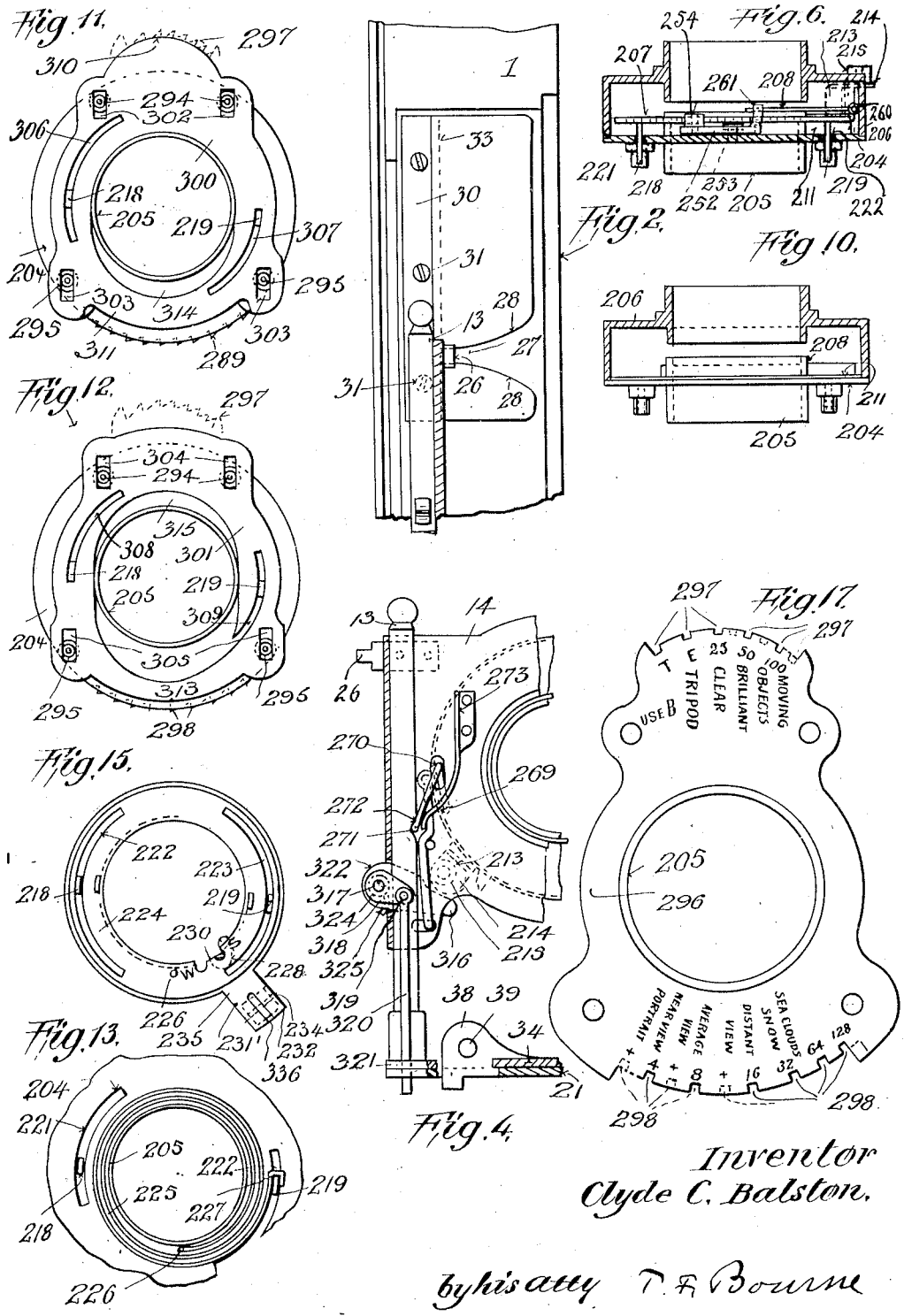

May 10, 1927.  
C. C. BALSTON  
PHOTOGRAPHIC CAMERA  
Original Filed Nov. 9, 1917 8 Sheets-Sheet 3
1,627,722
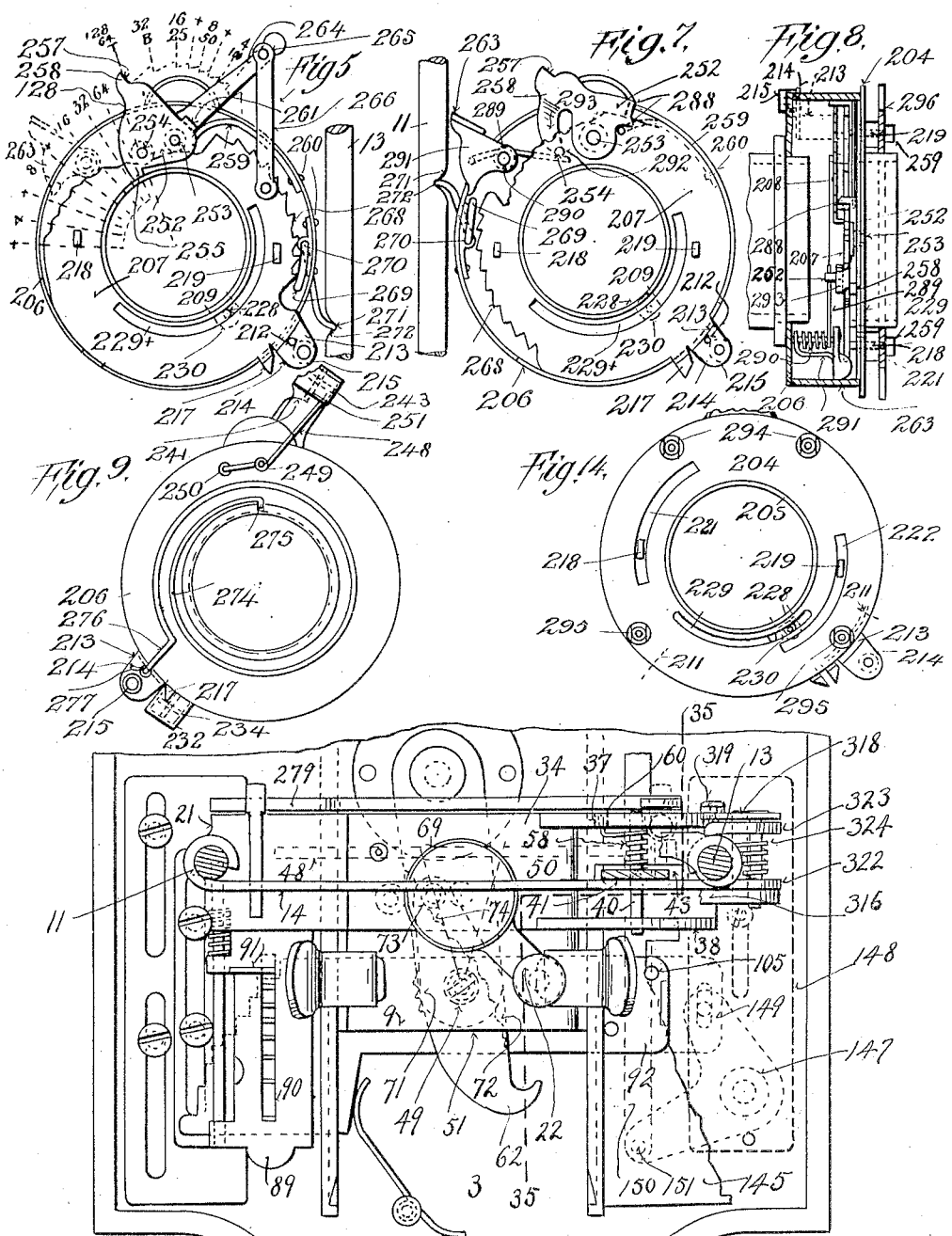

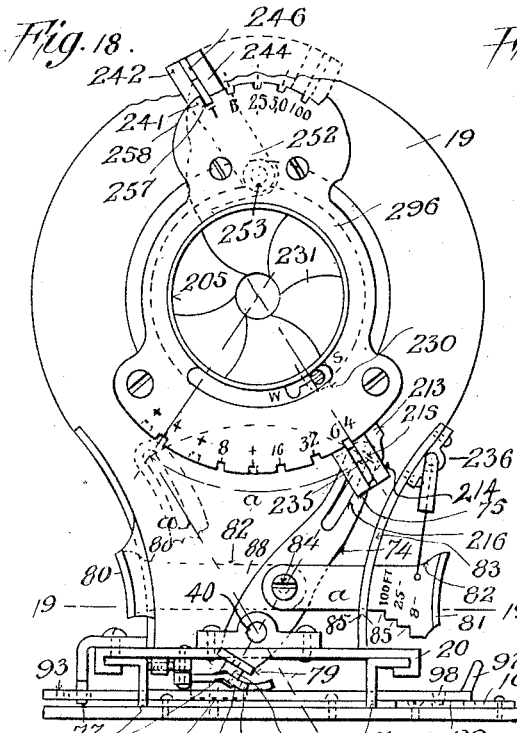

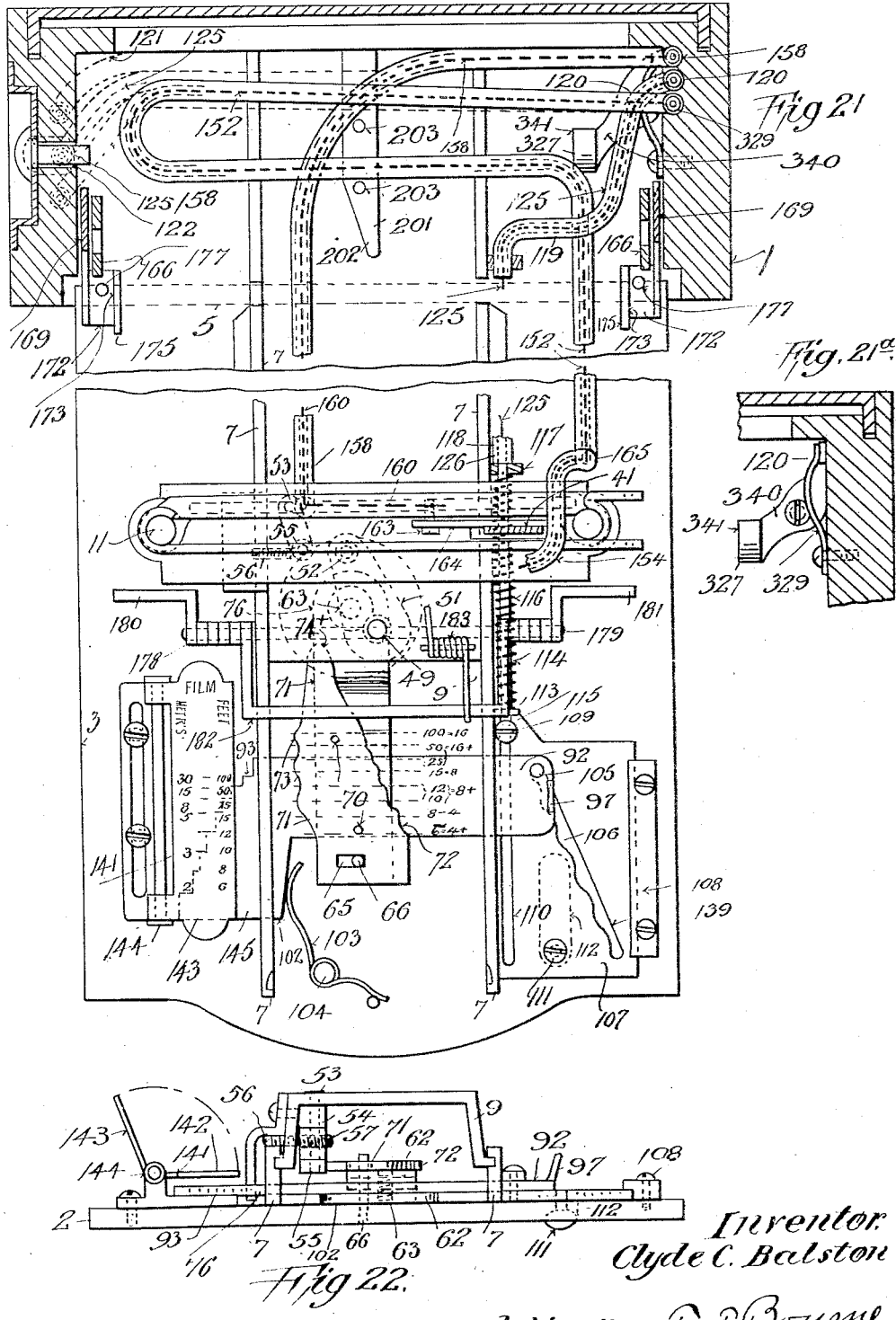

May 10, 1927.
C. C. BALSTON
PHOTOGRAPHIC CAMERA
Original Filed Nov. 9, 1917    8 Sheets-Sheet 6
1,627,722
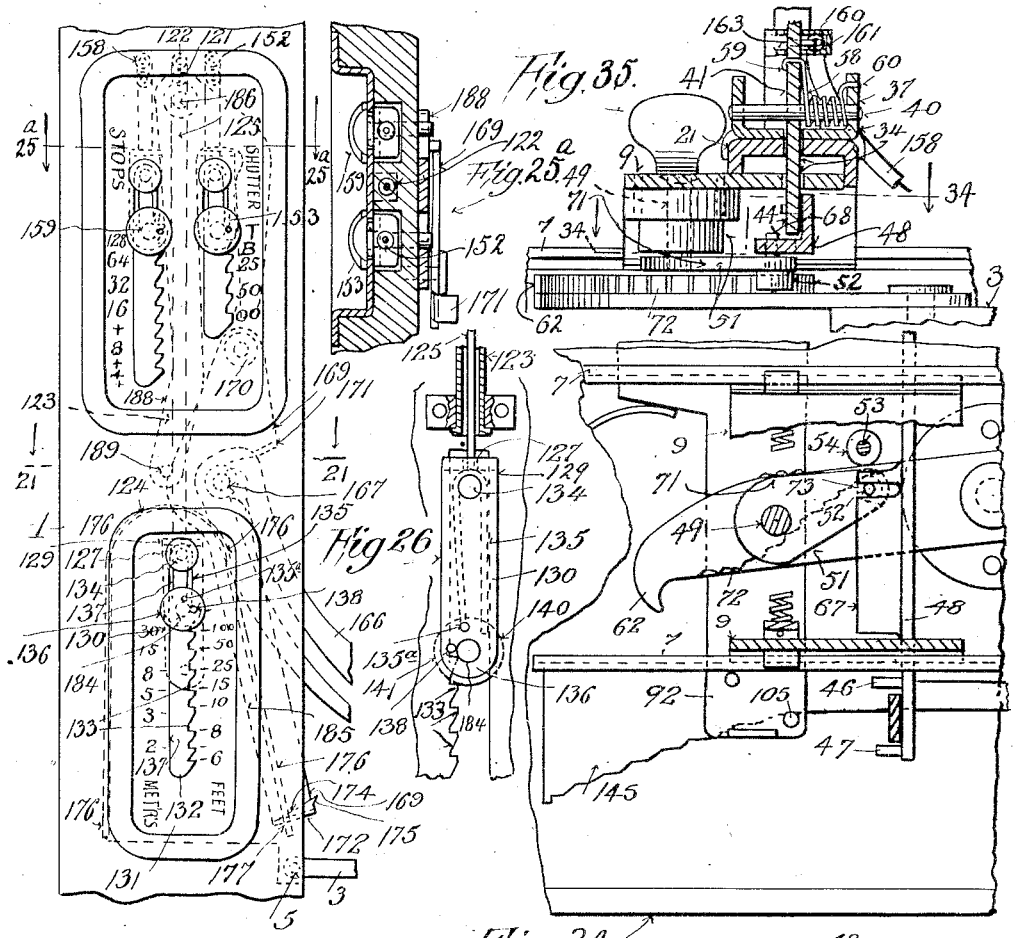
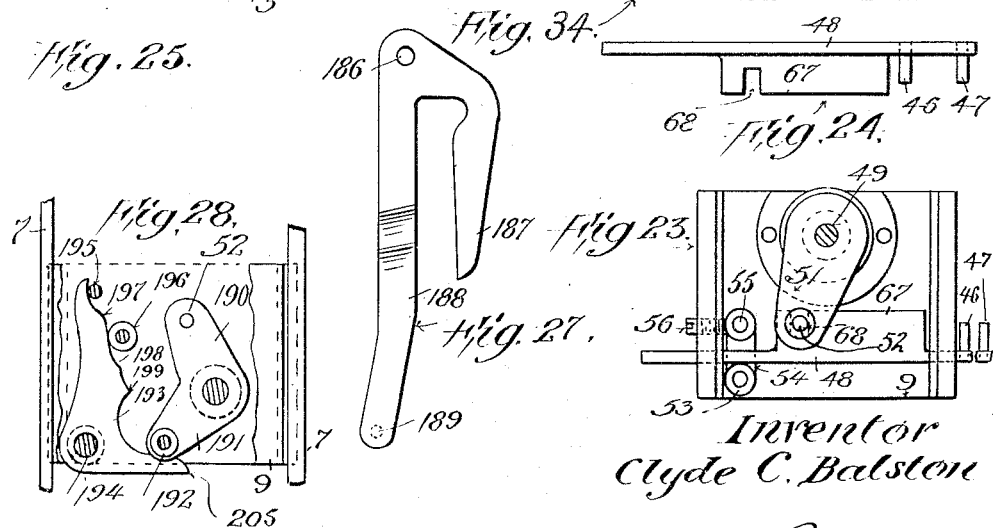
Inventor
Clyde C. Balston
by his atty Inventor
Clyde C. Balston
by his atty

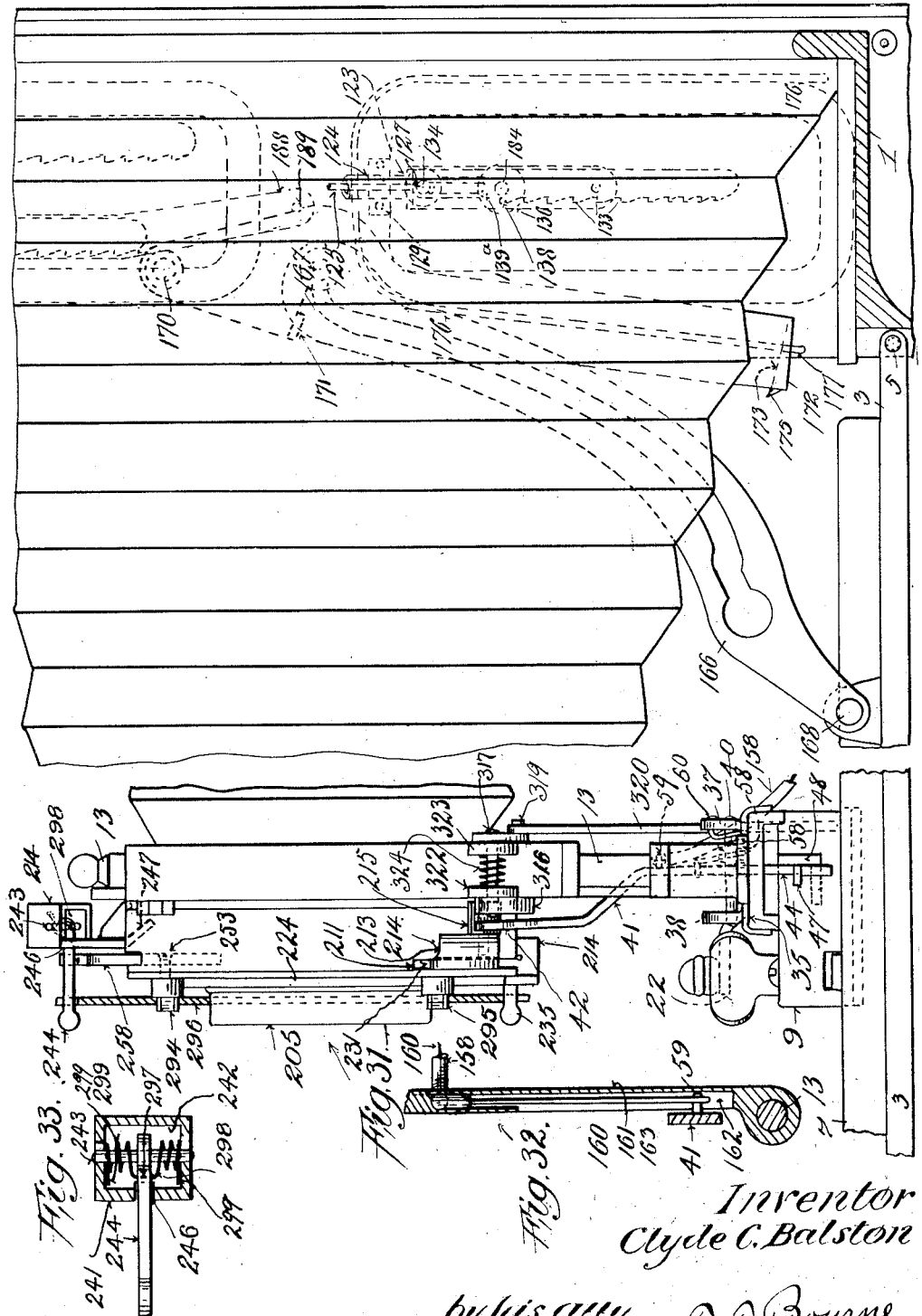

Patented May 10, 1927.  1,627,722

UNITED STATES PATENT OFFICE.

CLYDE C. BALSTON, OF NEW YORK, N. Y.

PHOTOGRAPHIC CAMERA.

Application filed November 9, 1917, Serial No. 201,059. Renewed December 8, 1926.

My invention relates to improvements in cameras and to the light controlling devices of the lens therefor, and has for its objects, first, the automatic setting of the diaphragm, shutter, and focal distance, separately or in combination, second, the setting of the same singly or together by the simple process of drawing out the lens supporting the front, and, third, auxiliary means of setting the focus scale when the camera is closed; the primary object being to obviate the requirement of skill or special knowledge on the part of the operator as to the proper or required setting of diaphragm, shutter and for focus, in taking pictures, but to provide means whereby arbitrary settings of either of said features may be made at will, and to provide means whereby when the camera is closed, the diaphragm, shutter and the focus scale shall be automatically reset to normal position, and shall automatically reset to proper position for taking the picture upon the reopening of the camera.

Figure 1:
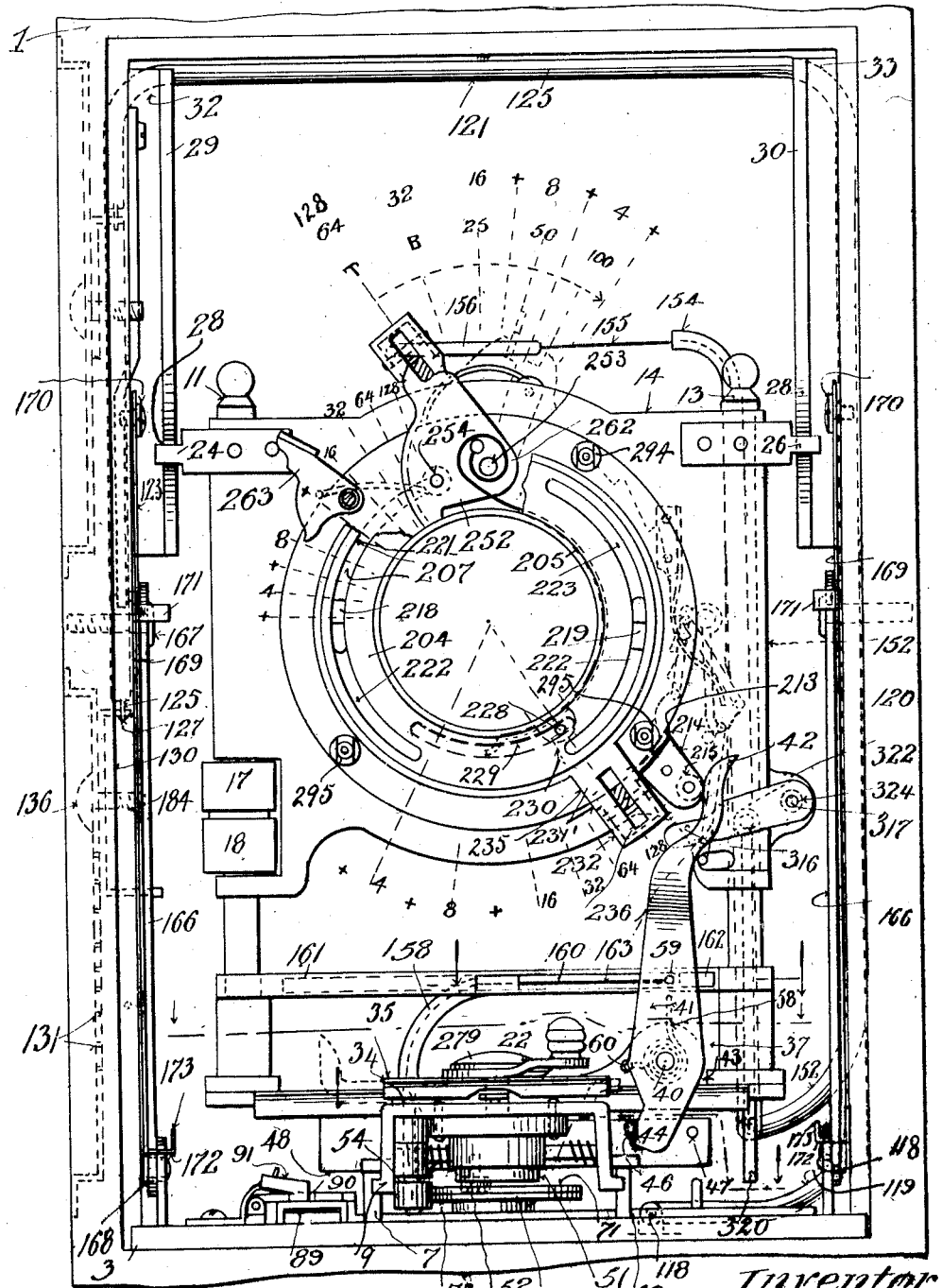
Figure 29:
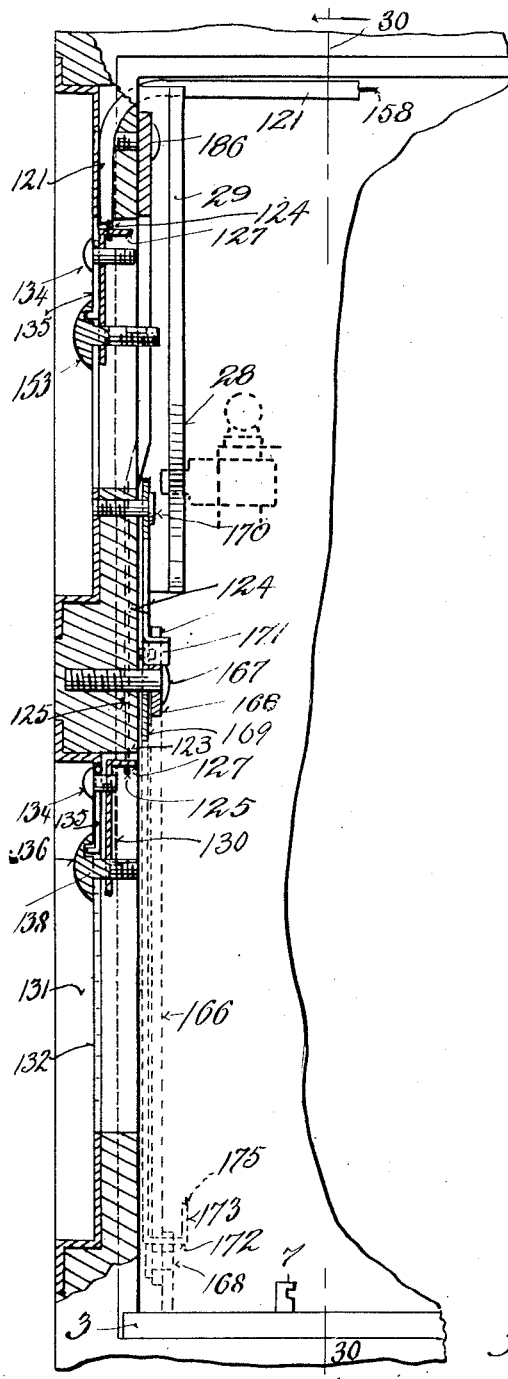
Figure 30:
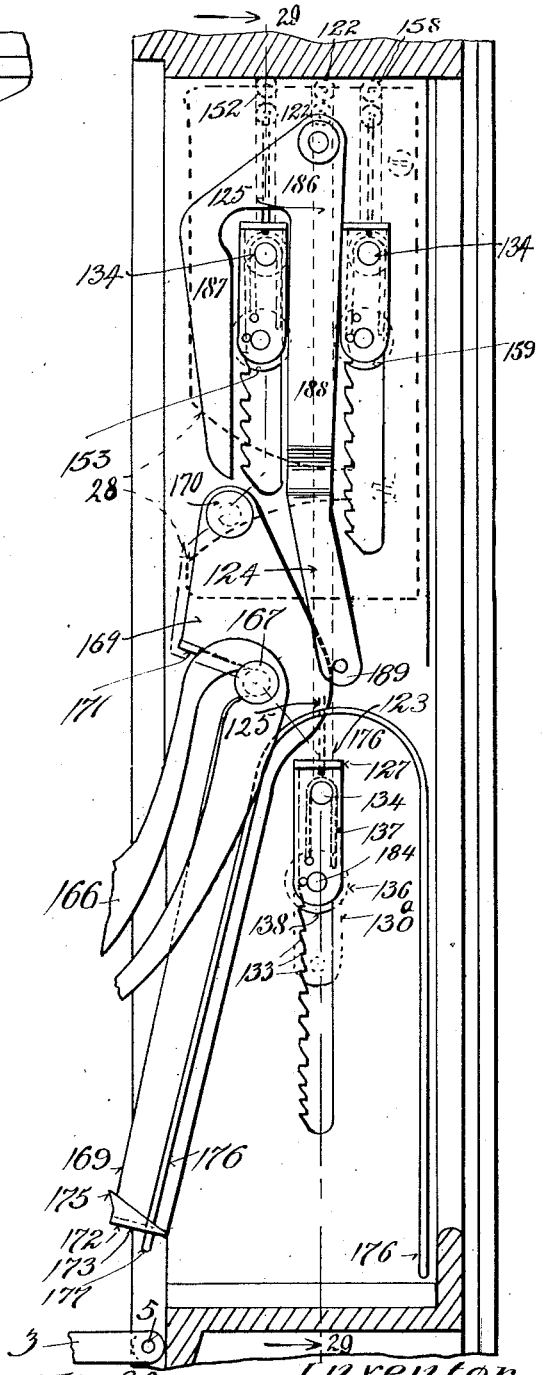

In the accompanying drawings Fig. 1 is a front elevation partly broken away, of my invention as applied to a folding camera having a vertically and horizontally shiftable lens support; Fig. 2 is a detail of the lens support centering device of Fig. 1, partly broken away; Fig. 3 is a plan view of a portion of Fig. 1, partly broken away; Fig. 4 is an obverse view of a portion of the lens support and devices of Fig. 1; partly in section and partly broken away; Fig. 5 is a front view of a modification of the shutter and diaphragm setting device; Fig. 6 is a partly sectional view of Fig. 5, but with an auxiliary lever and link omitted; Fig. 7 is a detail of a portion of Fig. 1; Fig. 8 is a plan view of the setting mechanism of Fig. 7, but shown partly in section; Fig. 9 illustrates two springs on the obverse side of Fig. 5; Fig. 10 is a view partly in cross section of the lens tube and diaphragm barrel of Fig. 5; Fig. 11 shows a slotted plate on guides on the front plate of diaphragm barrel; Fig. 12 shows another slotted plate of said barrel plate; Fig. 13 shows said barrel partly broken away and a spiral spring thereon; Fig. 14 illustrates said barrel plate, slots therein and guide pins thereon, a lever, and a modified catch projecting therefrom; Fig. 15 illustrates a slotted cup plate and lever catch device; Fig. 16 is an enlarged vertical section of the lens tube, diaphragm barrel and the devices contained therein and carried thereby; Fig. 17 is an enlarged view of the front plate carrying the diaphragm and shutter scale and indentations; Fig. 18 shows a front elevational view, partly broken away, of a simplified form of camera and the application of the invention thereto; Fig. 19 is a plan view of Fig. 18, taken below the line 19, 19 thereof; Fig. 20 shows a portion of the camera door and track, partly broken away, and a form of automatic focus device; Fig. 21 is a plan view (with bellows omitted as in Fig. 1) of Fig. 1 partly in section on line 21, 21 of Fig. 25, and partly broken away, showing the lens support and carriage therefor; Fig. 21ª is a detail of a switch device of Fig. 21; Fig. 22 is a front elevational view of the lower portion of Fig. 21; Fig. 23 is a detached view of the under side of the carriage of Fig. 22; Fig. 24 is a detached view of a slide bar pertaining to Figs. 1, 3, 21, 22 and 23; Fig. 25 is an elevational view of a side of the camera, partly broken away, illustrating an improved method of setting the lens focus, diaphragm and shutter; Fig. 25ª is a detail section on line 25ª, 25ª of Fig. 25; Fig. 26 is a detached obverse view of the button strip device of Fig. 25; Fig 27 is a view of a detached release lever of Fig. 25; Fig. 28 is a plan view, partly broken away, showing a modified form of diaphragm and shutter actuator; Fig. 29 is a section on line 29, 29 of Fig. 30; Fig. 30 is a section on line 30, 30 of Fig. 29; Fig. 31 is a partly sectional side elevation of a portion of the camera with the lens extended; Fig. 32 is a sectional detail of part of Fig. 31; Fig. 33 is a sectional detail of the shutter catch device; Fig. 34 is a detail of a portion of Fig. 3 partly in section substantially on line 34, 34 of Fig. 35; and Fig. 35 is a detail section of Fig. 34.

It will be noted in the drawings that the camera bellows has been omitted for purposes of illustration, and that certain numbers used in the drawings and specification to indicate positions of setting of the diaphragm, shutter, and focus, do not occur as reference indications for parts.

In Fig. 1, the diaphragm and shutter scale, shown in Fig. 17 has been omitted for purpose of illustration of action. The reference numeral 1 represents the camera casing, supplied with the ordinary rigid or folding bed 3, hinged, if folding, as at 5, and supporting the ordinary track 7 adapted to slidably receive a carriage 9 having upright members 11, 13, slidably supporting a lens board or front 14, having any elevating means, such as 17 indicating a nut on a threaded post 11, and a catch as indicated at 18 to hold said lens board in normal position as is usual in certain styles of cameras, as in Figs. 1, 2, 3, 4, 21, or having a rigid lens board or support 19 carried by a carriage 20, as in Figures 18 and 19. The carriage 9 supports a horizontal cross slide bed piece 21, to which are secured the uprights 11, 13, the bed piece 21 being held in normal central position by any efficient ordinary catch device represented by the usual lever and knob binder 22.

In order to assure the normal central position of the lens board 14, two lugs 24, 26 are secured to and extend beyond the side thereof, and are adapted to enter a lock or centralizing slot 27, 28 formed in plates 29, 30, secured at opposite sides on the inside of the frame 1, as at 31, Figs. 1 and 2, the said plate being offset from the frame surface as at 32, 33, as the lens front cannot be completely moved into the camera box or frame until the lens board is adjusted to central position vertically and horizontally, by the entrance of the said lugs in their respective slots. This device assures the centralizing of the lens board before the camera can be closed. On top of the cross slide 21, Figs 1, 2, 4, and 29, is a saddle or binder plate 34 which at the sides 35, 36 overlaps the slide 21. The said binder occupies a fixed position over the slide 21, and does not slide with the latter. At one end I provide this binder with upwardly turned portions 37, 38 and holes 39 adapted to receive a pin or stud 40 serving as a fulcrum to a lever 41, which lever extends above the stud and is shaped as at 42, and downwardly through an opening 43 formed in the binder plate 34 and slide 21, and below the latter, as at 44, where it passes between the pins 46, 47 secured in a slide bar 48 which is shaped as shown in Figs. 24, 29 and is slidably fitted in slots formed in the opposite sides of the carriage 9, as shown in Figs. 1, 3 and 23.

To the under side of carriage 9 is pivoted at 49 a lever 51 having at its free end a pin and preferably a roller thereon 52 (Figs. 1, 3, 21, 23). Also to the under side of said carriage is pivoted at 53 small lever 54, having at its free end a pin fitted preferably with a roller 55. An adjusting screw 56 threaded in the side of the carriage bears at its inner end against the lever 54 or the said adjusting screw may be threaded into the lever 54, as at 57, and bear against the inside of the carriage side (Figs. 22, 23). A wire or other suitable spring 58 surrounds the stud 40 engaging the lever 41 at 59 and a binder plate part 37 at 60 to hold the lever in approximately normal position. Adjacent the focal scale position, and preferably between the rails 7 of the track, is secured an actuating plate 61. This actuating plate may be made in various forms and may be rigidly secured to the bed 3, or may as shown be movably secured to said bed. Figs. 19 and 21 represent the preferred forms of this actuating plate, in which the plate 62 is pivoted as indicated at 63 and at its other end is provided with a slightly elongated opening 65 adapted to loosely receive a pin 66 secured to the bed 3, Figs. 19, 21, 23, to limit the movement of the said plate.

The bar 48 slidable through and under the carriage 9 (Figs. 1, 2, 23, 24) has an angular portion 67, and a slot 68, into which slot fits and moves the pin or roller 52 of the lever 51. The actuating lever 62 is offset upwardly slightly as indicated at 69 (Figs. 3 and 21), in order that it may pass freely over the focus scale device shown therein, disposed transversely thereto, and which will be described later. Integral with or firmly secured to the top of the lever 62 by any suitable means, as indicated at 70, is a step or cam plate 71, provided on its right or one edge with a series of graded steps 72, the said steps being of gradually increasing width and corresponding in longitudinal distances and proportionate relative length to the position and proportionate length of the spaces of focal distances indicated on the respective focal scale. The opposite edge of the cam plate may be provided with projections as at 73, disposed opposite certain of the aforesaid steps representing closely disposed focal distance indications, such as opposite the small space between 100 ft. and 50 ft.—25 ft. and 15 ft. and 12 ft. and 10 ft. of the focal scale of Fig. 21 and between 100 ft. and 25 ft. of the abridged focal scale of Fig. 19.

It will be seen that when the carriage is brought forward to focal position, the roller 52 of the lever 51 will strike against the angular or curved end at 74 of the edge 72 of the cam plate 71, and will be moved to the right, and thereby move the cross bar 48, and the lever 41 a distance proportional to the forward and sidewise movement of the roller 52 along the steps 72 of the said cam plate, and that as the carriage 9 or 20 comes to rest against the desired focal stop, the roller 52 will have come to rest against the step of the cam plate 71 corresponding to the desired focal distance indicated on the focal scale, and that the lever 51 will have been set at an angle corresponding to the relative position of the step on the cam plate on which the roller 52 rests. To facilitate the action of the roller 52 on the steps 72, the said steps effecting said roller 52 are glided into or angularly inclined to one another, leaving short flat surfaces representing the different steps disposed between the angular surfaces thereof, to permit the pin or roller 52 to ride easily from one step to the other with increasing side motion along the length of the edge of said cam plate 71. It may be noted here that the upper free end of the lever 41, at 42, Fig. 1, and of the lever 73, at 75, Fig. 18, engages the device for setting the diaphragm of the lens to its various sizes of openings (this engagement and action will be fully set forth later on), so that the diaphragm indexing and setting device will be moved to index positions corresponding to the respective steps on the edge 72 of the cam plate 71, that the roller 52 comes to rest upon. In Fig. 21 the focal scale is graded as shown from 100 to 6 ft. and to the corresponding meters, and the cam plate 71 is marked with indications showing the relation that the indications of the focal scale bear respectively to the steps of the cam plate, and to the diaphragm openings, which latter are also indicated as on the diaphragm and shutter scales, in Figs. 1, and 17 and 18. In the simpler camera shown in Figs. 18, 19 and 20 but three focal steps are shown and three corresponding cam steps 72. In Fig. 21 it will be seen that 100 ft. of the focal scale corresponds to a cam step marked 100–16, i. e. 100 ft.=#16 diaphragm opening; 50–25 ft. corresponds to the cam step marked 50–25=#16+; 15 ft. corresponds to 15=#8; 12–10 ft. corresponds to 12–10=#8+; 8 ft. corresponds to 8=#4; and 6 ft. corresponds to 6=#4+. In Figs. 19 and 20 100 ft. corresponds to #16 diaphragm; 25 ft. to #8, and 8 ft. to #4. These relative proportions may, of course, be differently established and set. Assuming that the lens support carriage 9 or 20 is moved forward until the focal index lug 76 (Figs. 21 and 22) and 77 (Figs. 18 and 19) comes to rest at 100 ft. of the focal scale, the pin or roller 52 will glide against the angular or curved edge 74+ of the cam plate 71, and cause the lever 51 to be deflected to move the lever 41, 42 or 74, 75 to such a position as will set the diaphragm index device to #16 of the diaphragm index plate. It will be borne in mind that one of the objects of this invention is for the purpose of the diaphragm automatically setting to proper snap shot positions, and since neither stop #128, #64, or #32 is ordinarily usable for snap shot exposures but is used almost exclusively for time exposures, the said actuating levers and stop index device standing normally at stop index #128 or 64, moves at once from such normal time stop position to #16 stop, the smallest stop usually used for snap shot exposures. If the carriage 9 is brought forward to 50 ft. of the focal scale, a compound actuating action takes place as follows: The cam step marked 50–25=#16+ is preferably laterally disposed only a half step, and the half step projection 73 opposite said step on the opposite side of the cam plate 71 by virtue of the roller 55 carried by the carriage 9 gliding against it and thereby forcing to the right the said cam plate the distance of a half step, the lever 41, 42 (or 74–75) is given a full step movement. The adjusting screw 56 adjusts the roller 55 to effect the proper movement and to compensate for slack and wear. A similar action takes place at 50=#16+, 15=#8, and 10=#8+ as shown in Fig. 21, and at 25=#8 in Fig. 19. The object of this action is to divide and lessen by one half the space or measurement of a full step movement, and to half the angle of the same in the glide of the roller 52 from one step to another where the steps are short due to the short interval between certain of the distances on the focal scale and the corresponding focal lens positions.

In Figs. 18 and 19 the roller 52 is attached directly to the heel of the lever 74 in any suitable manner, such as by pin 78 riveted in a turned over portion 79, and the cam plate 71 is preferably curved as shown in Fig. 18 to the radius described by the said roller. On the lens support or on the carriage of Figs. 18, 19 is secured or formed a projecting finger pull device 80 curved slightly outwardly as shown in Fig. 19, and a corresponding one 81 is carried on the opposite side of said lens front or support and has a shank 82 passing loosely through a slot formed in the upright of the lens support, as indicated at 83, which shank is attached by a screw or otherwise to the lever 74 at 84, and is preferably provided with graded steps 85 corresponding to the lever position of the diaphragm stops, the slot 82 being of sufficient width to allow the raising of the finger pull piece 81 during the drawing out of the lens support, to allow it to be forced in to cause either of the steps 85 to come to rest against the lower edge of the slot 83. In this connection, instead of the lower end of the lever 74 terminating in a pin or roller 52, it may have a plane or square end or edge 86 (Fig. 20), and the cam plate may be formed as shown into square steps, the lateral surfaces of the steps representing the focal distances and the longitudinal surfaces representing the diaphragm stop openings and indications as shown. This square step cam plate 87 may be securely fastened to the lens support camera bed, and the point 86 of the lever 74 may be caused to set against it by the movement of setting of the finger pull piece 81 to move the lever 74 to the various diaphragm stop positions and the shank 82 thereof may or may not be provided with the steps 85. The journal 88 of this lever 74 is preferably placed in the center of the lens support or carriage. It will thus be seen that the action of setting the diaphragm to any one of the different positions and apertures will, by this means, also determine and set the lens support (and carriage) to the corresponding focal position, the relation between light and distance being generally constant in that light quantity is proportional to increased area and distance, light quantity, therefore, being, in general, proportional to focal distance, and that by employing the devices shown, either the moving of the lens support to focal position sets the diaphragm to corresponding and appropriate index number and aperture, or, conversely, the setting of the diaphragm to desired position and aperture determines the corresponding focal position of the lens support and its lens. In Figs. 1 and 3 is shown the form of focus scale 89 having a slot 90 and index stop device 91 as usually employed in this type of camera. Any focus scale device may be employed in connection with my invention, but in Figs. 18, 19, 20 and 21, I have illustrated a preferred form of focal scale device, which consists of a plate 92, disposed at right angles to the track 7, and passing through slots formed in said track, which slots may serve as guides to the movement of said plate 92. At one end of said plate 93 are cut steps corresponding to the various focal distances at which the lens support is to be arrested. A stop device, Figs. 18 and 19, consisting of a plate 94 having a slot 95 and a screw 96 to clamp it in proper focal position to the carriage, is provided with a tooth or lug 77 adapted to move against the focal scale steps (tooth 76 in Figs. 21, 22). This plate 92 may have a finger pull device as shown by the upturned part 97 and a pin 98 projecting downwardly into indentations 99 formed in the upper surface of a plate 101, secured to the camera bed, and adapted to be moved to the various positions and held by the spring contact of said pin and indentations. In Figs. 21, 22, is shown a larger focal scale device, in which the plate 92 is widened at 102, and may be held in normal position by a spring 103 secured as at 104 to the camera bed. The opposite end of this plate 92 may be shaped as described at 97, but a pin 105 secured in said focal plate projects downwardly freely into the path of the steps 106 formed in a cam plate 107 held slidably by a retainer and guide 108 and screw 109 in a slot 110 in plate 107. A finger knob or projection 111 may project upwardly from said plate and downwardly through a slot formed in the bed 3, as indicated by the dotted lines 112, (Figs. 21, 22), to enable the setting of the focal device from the outside of the folding bed or door, when the latter is folded or closed. The cam plate 107 has an upturned portion 113, adapted to slidably receive in a hole a rod 114, having a head 115. On this rod 114 is placed a wire spring 116 which bears against the portion 113 of plate 107 and against a lug 117, through a hole in which lug the rod 114 slides. Securely fastened to the lug 117 is the wall or tubular portion 118 of a flexible cable 125, shown broken and then continuing into the camera case as at 119, upwardly at 120, across the underside of the upper part of the camera frame or case as shown by the dotted lines 121, either below said frame as at 122, or bedded therein as indicated at 122 (see Figs. 1, 21, 25 and 27) and then downwardly as shown by the dotted position 123 to a retaining clamp or holder indicated at 124 which attaches it to the inside of the camera case 1. The flexible cable 125 (whose tube 118 may be made rigid throughout most of the portion thereof contained in the camera casing, and then flexible from the lower portion 120 to 117) is securely fastened to the end of the slidable rod 114 at 126 its opposite end 127 being secured to the turned over portion 129 of a member 130, which member is slidably secured to the outside of a plate 131 having an elongated slot 132 which has indentations or catch devices, as shown at 133 on one edge of said slot. These catch devices correspond in proportional distances apart to the proportional distances apart of the steps 106 of the side cam focal adjusting plate 107, which steps 106 in turn correspond to the increasing distances and position of the focal stop steps 93 of the focal plate 92. The distances apart of the catch members 133 are proportional to and correspond with the distances apart of the index numbers of feet and metres of the focal index scale indicated on plate 131, which is preferably as shown recessed in the camera side frame 1. The shank of screw or rivet 134 passes through the slot 132 and is secured to the slidable member 130 to hold the latter in position in its relation to the plate 131. The end of a spring 135, as at 135$^a$, connects in a hole formed in the under side of a button 136, the shank of which button passes also through the slot 132 and is secured to the member 130 (Figs. 25 and 26). The spring loops around the shank of the rivet 134, its free end pressing against the straight side, as at 137, of the slot 132. The diameter of the shank of rivet 134 with its spring looped around it is of a size small enough to freely slide in slot 132, and as the width or diameter of the shank of the button 136 is enough smaller than the width of the slot 132 it permits of a lateral motion by finger pressure on the button 136, and the member 130, to force them to the left. Such movement of the button 136 will cause its catch pin 138, which projects into and engages the catch members 133, and which is held normally in catch position by the spring 135, to disengage either of the catch members 133 that it may be in engagement with, from any catch and index position it may occupy below the normal top position in which the button 136 is shown, thereby permitting the return of the button 136 to such normal position by the tension exerted by the spring 116 against the portion 113 of the cam plate 107, and the lug or journal 117 of the camera bed. The smooth plane edge 139 of said cam plate 107, by gliding against the pin 105 of the focal scale device 92, returns it to normal position. It can readily be seen that if the button 136, which is provided with index pointers 140, 141, on its opposite sides to indicate the numbers on the focal index scale, is moved downwardly until its pin 138 comes in engagement with the required catch members 133 of the focal index scale, the pull on the flexible wire 125 will cause the setting of the focal scale device, either when the camera bed or door 3 is closed or open. 141 indicates the focal index scale usually supplied and secured to the bed or door of the camera illustrated in Figs. 1, 3, 21 and 22. This scale has an under fixed index plate 142 for sensitive plate exposure, and a hinged index plate 143 for sensitive roll film exposure, hinged as at 144 and adapted to be turned back as shown in Fig. 22, when sensitive plates are employed. In employing such a (or any visible) focal index scale 141 on the camera bed in connection with the focal plate 92, I set the said focal index scale farther away from the track 7, so as to allow a free space 145 for the travel of the lug 76 of the carriage 9 against the steps 93 of the plate 92, the surface of the plates 142, 143 being plane and without the catch indentations or movable stop, such as are shown at 90 and 91, Figs. 1 and 3.

But the index numbers for distances can, of course, be marked on the focal plate 92, adjacent their respective steps 93, as shown in Fig. 19, and the index plate 142, 143, 144 be dispensed with.

In Fig. 3 is shown an open cam plate 145 which is adapted to connect as at 146 in the manner described regarding the flexible cable 118, 125. As modified means of moving the focal plate 92, a bell crank 147 pivoted as indicated at 148, and engaging by a pin and slot 149 the focal plate 92 is adapted to connect through a rod 150 movably secured to it by a pin as indicated at 151 with the flexible cable 118, 125 at 146, in the manner heretofore stated. At the top of Figs. 1 and 25 index and setting devices for diaphragm and shutter are shown. These devices, although shown in double column, are similar in all respects mechanically to the one described concerning the focal distance setting scale, consisting of like buttons, connections and flexible cables, a point of difference concerning the cables being that they are of greater length than cable 125 and are intended to be drawn out and folded or doubled back into the camera case when the carriage and lens support 9, 14 is moved out or in. These two cables are indicated in partially folded position in the bottom of the camera casing in Fig. 21, in which the forward part of the cable marked 152 leading from the button 153 of the shutter setting device (Fig. 25) is connected securely in any suitable manner with and is carried by the lens support 14 (Fig. 1) passing upwardly as shown (the encasing cable tube being rigid on the said support) and being curved forward and over as at 154 (Figs. 1 and 21), the cable 155 thereof having a loop portion 156 adapted to engage movably and by a pin indicated at 157 slidable in said loop with the shutter setting device therein shown. The said slot and pin arrangement permits the operation of the shutter independent of the cable connected therewith. The spring that returns the shutter device to normal position returns the cable 155 and its button 153 to normal position by the spring action of the shutter device, which will be described later on. The other cable tube 158 and its cable 160 connects with the button 159 governing the diaphragm apertures or stops at one end and with the lever 41 of the lens support at the other end—the cable tube 158 connecting in any suitable manner with the lens support as indicated in Figs. 1 and 21, in which it is connected with a horizontally disposed tube 161 into which is led the cable 160. An elongated opening 162 is formed in the side of said tube, and a pin 163 (see Fig. 21) connects a link 164 with said cable, the said link connecting at 165 with the lever 41. The indications and catch positions shown on the shutter scale of the cable setting device of Fig. 25, correspond in distances apart proportionally to the distances apart and the indications and setting positions of the shutter setting device connected with the lens shutter of Figs. 1 and 17; and similarly the indications and catch positions of the diaphragm setting device of Fig. 25 correspond with the diaphragm setting scale and device and the diaphragm indications carried by the lens barrel indicated in Figs. 1 and 17. As it is necessary that the shutter, diaphragm, and focal step plate shall return to normal position i. e. to T, 128 or 64, and to 100 ft. respectively when the camera is closed, so, and in a manner that, they may be reset to new indications before again opening, or after opening the camera, it is necessary to provide a strip or normalizing device to effect such result. To effect this I employ the action of the ordinary slotted side bracket 166 common in folding cameras, the same being pivoted at 167 to the camera casing and at 168 to the folding bed or door 3 in the usual manner. Pivoted above the brackets 166 at 170 are levers 169, which are cleared around the pins 167 of the brackets and are provided with lugs 171 extending freely over the upper portion of the brackets 166. The lower ends of these levers are turned inwardly and upwardly as at 172, 173, and are provided with inclined edges 174, and points 175. A spring wire 176 secured to the camera casing in any suitable manner, passes through a hole at 177 in the foot of the lever 169, and exerts a tension to hold the latter in forward position.

On opposite sides of the carriage 9 are pivoted as shown at 178, 179, but in a suitable manner, spring pawls 180, 181, the intermediate portion 182 of the wire of which pawls loops around in front of the carriage and bears on the track 7, being held in normal position thereon by the light pressure of a spring 183, carried by the carriage (see Fig. 21). The action of this device has formed part of the subject matter of my U. S. Letters Patent No. 1,362,833 issued Dec. 21, 1920, and further description is not necessary except to say that the retarding of the camera front through action of the said pawls 180, 181 on their respective levers 172, forces back the said levers, trips thereby the side brackets 166 from their pins 167 and upon the folding of the camera bed or front immediately releases the levers 169 and the side brackets so that their springs thereupon force them forward again to operative position. It will be noted that the shank 184 of the button 163 extends inwardly past the path of movement of the back edge 185 of the adjacent lever 169, the said edge being shaped at such an angle and length as to engage said shank 184, at whatever index position its button may occupy along the scale 131, and to so force the said button out of its engagement with engaging teeth or members during the backward or tripping motion of the said lever 169 during the closing of the camera front or bed, thus allowing the spring 116 (Fig. 21) to return the said button and cable to normal position, and to again free the path of movement of the shank of said button to permit of its immediate resetting, as the back edge of the lever 169 clears away from the said button's shank.

Fig. 27 shows a lever pivoted to the camera casing at 186, and having an arm 187 extending in the path of the front side, the shank of button 153, and a longer arm 188 having an edge extending in the path of the front side of the shank of button 159 and having a pin or lug 189 projecting across and back of the curved out portion of lever 169 to receive the action from the movement of said lever, in the manner pertaining to the button 136. A direct thrust form of actuating device is shown in Fig. 28, in which the actuating lever 51, carried by the carriage 9, is modified in the form of a bell-crank 190, 191, in which the continuation of the pin or roller 52 projects upwardly, as in the action formerly described, to extend into the slot 68 of the part 67 of cross bar 48 (Fig. 24). The arm 191 carries the pin or roller marked 192 that projects downwardly and is adapted to impinge upon and be moved by the second member 193 pivoted at 194 to the camera bed, (Fig. 24). A limit pin 195 is placed in the camera bed, out of the path of travel of the pin or roller 196, the latter being adapted to be secured to and depend from the carriage 9 into the path of the edge 197 of the member 193. The step or cam surface given to the arm of member 193 at 198, 199 is for the purpose of the roller 196, forcing the member away, in order to impart increased movement where desired to the arm 200 thereof, and to the bell crank 190, 191 to impart proper and easy motion to the lever 41, 42. 201 represents a cam plate the inclined edge 202 of which is adapted to force over slightly to the left the roller 52 of lever 51, to impart a short opposite movement to the lever 41, 42, or 74—75 to that imparted by the cam plate 71. Said cam plate 201 is secured as by rivets 203 securely to the camera casing. The effect of this cam will be afterwards explained.

The shutter and diaphragm setting mechanism pertaining to the lens and diaphragm tube or barrel is as follows: Figs. 5 and 7 show the front or cap plate 204 and front lens tube 205 removed from the shutter barrel 206 exposing the diaphragm and shutter control device actuating cam plate 107, Fig. 7 shows a somewhat modified form of cam plate 207 and mechanism coacting therewith.

Projecting from the back of the cap plate 204 is a tube 208. The cam plate 207 fits operatively over the tube 208, the edge of hole 209 formed centrally in the said cam plate serving as a journal to permit the said plate to oscillate on the tube 208 (see Fig. 16), a retaining sleeve 210 being secured in any manner to hold the cam plate 207 in operative position on the tube 208. A slot 211 is formed through the barrel 206 for about one-third the circumference of said barrel, and an extension 212 of said cam plate projects through said slot and is bent at right angles away from the face of the said plate as at 213, and again parallel with the said face as at 214, and supports a pin or roller 215 on the under side thereof. This pin or roller is acted upon by the upper part 42 of the lever 41 (Figs. 1, 16) or is in constant engagement with the slot 216 of the lever 74—75 as in Fig. 18, the movement of said lever serving to oscillate the said cam plate 207 to the various positions the lever is actuated to by the steps 72 of the actuating cam 71, corresponding to the various positions and indications of the diaphragm aperture index scale 64, 32, 16, 16+, 8, 8+, 4 and 4+. A portion of the extension of the said cam plate 207 is formed into a tooth or into two oppositely opposed teeth 217 (Figs. 1, 5, 7, 9, 14, 16 and 18), the said tooth extending beyond the portion 213 of the cam plate 207. Lugs 218 and 219 project upwardly from the cam plate 207 freely through concentric slots 220 and 221 respectively, formed in the cap plate 204, and freely through concentric slots 222 and 223 formed in a ring 224 which is preferably dished in on the under side as indicated at 224+ (see Fig. 16), to receive between its under surface and the cap plate 204 a coil spring 225, which spring at 226 engages said ring 224 and at 227 engages lug 219, the spring exerting a tension to keep the ring 224 in a righthand normal position. A pin 228 secured to diaphragm lever 231 projects outwardly and freely through a concentric slot 229+ formed through the cam plate 207 (Fig. 14) and through the concentric slot 229 formed in the cap plate 204 and engages detachably in recess S or W in the diaphragm controlling ring 224. Pin 228 by its connection with the diaphragm, serves as an auxiliary diaphragm setting means, whereby when pin 228 is in recess S the opening of the diaphragm will be suitable for summer, and when pin 228 is placed in recess W the size of the diaphragm opening will thereby be increased, as for winter light, and will remain so fixed during automatic setting of the diaphragm until the pin is again placed in recess S for automatic setting of the diaphragm at decreased size opening thereof. A knob 228ˣ on pin 228 facilitates operation of the latter (Fig. 16). It will be understood that when the ring 224 is oscillated its pin 228 by reason of engagement with the end of the diaphragm lever 230 (diaphragm indicated at 231) will cause the enlarging and diminishing of the diaphragm opening. 231' is an extension of the ring 224, which projects out over the diaphragm barrel 206 and is formed downwardly preferably in a cup or box shape 232, the sides of which box 232 are cleared away as at 233 (Fig. 16) to allow free passage of the tooth or teeth 217 of the cam plate 207. A cross pin 234 in said box pivots a lever 235 which lever is centered in said box by said pivot and passes freely through a narrow slot 236 and across the path of the movement of the cam tooth or teeth 217 to engage and disengage the latter, the slot 236 serving as a retainer and guide to the movement of the said lever. The heel of the lever at 237 is formed into a lug and a spring 238 is shaped and secured as shown at 239. When the said lever 235 is moved in and out by its free end, the heel 237 thereof will ride on either side of the projection 240 of the spring 238 and hold the lever in such position. A similar extension 241 and box 242, pins 243, lever 244, spring 245 and slot 246 are made on and carried by the ordinary shutter control and regulating lever indicated at 247 and which lever passes into the diaphragm and shutter barrel, as shown, back of the cam plate 207.

A coil spring 248, Figs. 9 and 16, is supported by a pin 249 secured in the back of the barrel 206, one end of which spring connects as at 250 with said barrel, the other end of said spring entering the box 242 and having a bearing as at 251 against the left side thereof to assist the usual shutter tension spring to assure the return of the so formed shutter control lever 247 to its normal lefthand position. In Figs. 1 and 5, it will be seen that a graded series of cam steps are formed on a portion of the outer edge of the cam plate 207, as indicated at 128, 64, 32, 16, 16+, 8, 8+, 4 and 4+. These cam steps glide into one another and their determining surfaces are disposed a distance apart radially, corresponding to the radial distances apart of the index numbers of the diaphragm index scale indicated by the like numbers located at the bottom of the barrel 206, Fig. 1, and at the bottom of the index scale plate of Figs. 17 and 18 (Fig. 18 omitting #128 of said scale). The difference of the circumferential diameter of the cam at the various steps corresponds to and determines the amount of motion to be imparted to the shutter controlling lever 241—247.

In operative connection with the aforesaid steps of the cam plate 207, a thin lever 252 is pivoted as at 253 to the obverse side of the cap plate 204, and supports a pin or roller 254, a portion 255 of said lever normally having a bearing on the lens tube 208, the upper end of said lever at 256 ending in a tooth comprising a straight edge 257 and an inclined edge 258. A spring 259 attached to the cap plate 204 or to the barrel 206 as at 260 exerts a tension on a lug 261 of the lever 252 to return it to normal position; or a coil spring as shown in Fig. 1 at 262 attached to the said lever and the cap plate 204 may be used for the same purpose. The pivoted member 263 represents the ordinary shutter trip device. It is obvious that the oscillations of the cam plate 207, by the action of the steps described upon the roller 254, will move the lever 252 so as to set the shutter controlling lever to the various speed positions. Extending as from the lever 241—247 in Fig. 5 is shown an arm 264 to which is pivoted at 265 a link 266, which at its lower end at 267 is pivoted to the cam plate 207. This merely shows a substitute form by which if the shutter lever 241—247 is moved to position by hand the cam plate 207 will be thereby operated to set the diaphragm and the focal plate devices to the various positions. In cameras having a shifting front as shown in Fig. 1, it is necessary to provide a means for automatically locking the devices described when set, so that they will retain their positions when out of engagement with each other when the lens front is raised or lowered or side shifted. To effect this result, I provide cam plate 207 with a series of ratchet teeth 268 corresponding in number radially with the number and the distances apart of the actuating cam steps 128 to 4+. A pawl 269 formed of a piece of light spring wire is journaled freely to the inside of the barrel 206 as indicated at 270. The end 269 of said pawl is adapted when moved inwardly to engage the teeth 268, such engagement and the disengagement with said teeth being effected by reason of the outer end 271 of the wire constituting said pawl 269 gliding into and out of a recess having inclined plane surfaces 272, formed in the upright 13 of the lens supporting device. In Fig. 4 is seen a spring 273 attached to the back of the lens support 14, and bearing upon the end 271 of said pawl to normally keep its end 269 out of engagement with the teeth 268 except as the said support 14 is moved out of normal position. On the back of the barrel is placed a wire coil spring 274 (Figs. 9 and 16) which is connected in any suitable way as at 275 with the back part of the barrel 206, its outer end 276 engaging the extension 214 of the cam plate 207 by means of entering a hole 277 as in Fig. 9, or by means of a pin 278 as in Fig. 16. The tension of this spring tends to return the cam plate to normal position upon the return of the lever 41—42 or 74—75 to normal position upon the retarding of the lens support or the closing of the camera. In Figs. 7 and 8 is illustrated a modified form of cam plate and shutter regulating action in which the lever 252 is provided with a lug 288 which overlaps the cam plate 207 and is adapted to be forced into contact with the steps thereof when the ordinary finger shutter trip lever 263 is depressed and before the shutter is actuated, by reason of a spring 289 coiled around the pivot 290 of the lever 263, and engaging with said lever at one end as indicated at 291, and having a bearing on the under side of a lug or pin 292 carried by an extending portion 293 which overlaps the cam plate and extends downwardly on the obverse side thereof, as shown. The spring 259 secured to the barrel 206, bears as shown upon a portion of the lever 252, to return it to normal position. In this action the spring 259 should be weaker than the actuating spring 289.

From the surface of the cap plate 204 two pairs of posts 294, 295 project and fitted to said four posts at the outer ends thereof is the shutter and diaphragm index plate 296 as shown in Figs. 17 or 18. The top edge of this plate is notched as at 297 to receive the lever 244, connected with the shutter regulating lever 241—247 to hold the said lever in either of the shutter regulating positions indicated by the index designations placed adjacent the notches. The lower edge of this plate is notched as at 298 to receive in the various diaphragm aperture positions indicated opposite such notches the lever 235 of the extension 231 of the ring 224 connecting with and operating the diaphragm controlling lever indicated at 230. The slots referred to may be either straight recesses as shown or in the shape of ratchet teeth as indicated in Figs. 1, 5, 7, 11 and 12, and the dotted recesses representing the plus index setting positions may be dispensed; and likewise the corresponding plus steps of the cam 207 may be dispensed. The levers 235 and 244 may stand out of engagement with the recesses 297 and 298 of the index plate 296, except when forced forward and into said recesses by hand, but if the ratchet teeth recesses are employed, then the coil spring 297 which bears upon the box 242 at 299, and upon the lever 244 as at 298, causes the said lever to remain in engagement with the ratchet teeth of the index plate until forced out of engagement therewith. The construction for accomplishing such result is as follows: Two thin plates 300 and 301 are provided with guide slots 302, 303 and 304, 305 adapted to fit over the four posts 294—295. Clearance slots 306, 307 in said plate allow free passage of the lugs 218, 219, and clearance slots 308, 309 to allow the passage of said lugs are formed in said plates. The top edge 310 of plate 300 extends up to the base of the recesses or teeth 297, and the bottom edge of said plate is cleared away as at 311 from the teeth on recess 289 of the index plate. In plate 301 the top edge 312 is cleared away from the recess or teeth 297 and the bottom edge 313 is extended to the base of the said teeth or recess 298 of the said index plate 296. It is obvious that if the cam plate 207 is oscillated in one direction, its lugs 218, 219 will move through the concentric slots of the plates 300, 301 without affecting the relative position of said plates, but that if the said cam plate is moved to the extreme in the opposite direction the said lugs will by impinging on the end of the said concentric slots force the said plates apart, the elongated central opening 314 and 315 which permits said plate to fit loosely over the lens tube 205, permits them to slide the required distance apart at their outer edges to force the levers 224 and 235 out of the recesses or teeth 297 and 298 and so permits by their respective spring actions, the return to normal position of the aforesaid respective shutter and diaphragm controlling levers. The plates 300 and 301 are, of course, interposed between the ring 224 and the index plate 296. It will be understood that the levers 224 and 235 may at will be moved by hand also to any desired index position either ahead or back of the position to which it may be automatically moved by the drawing out of the lens support and carriage, by simply drawing the said levers back far enough from the recesses of the index plate 296 to not only escape the same, but far enough to escape the tooth or teeth 217 of the cam plate 207, and to escape the teeth 257 and 258 of the lever 252. When the said cam plate returns to normal position the said teeth 217 and 257—258 will again engage their respective levers by forcing them outwardly temporarily and catching back of them. The action of the face 202 of the trip cam plate 201, Fig. 21, heretofore described, when the lens support is moved into the camera frame, causes, by the backward movement of the lever 41, 42 the tension of the returning spring 274, Fig. 9, and the spring 225, Fig. 13, to cause in the manner described the separation of the plates 300 and 301, to trip out of engagement the levers 224 and 235, with respect to the construction shown in Fig. 1; but this back trip action with respect to the construction shown in Fig. 18 is by the direct connection and pressure of the lever 74—75 instigated by the said cam edge 202 of the plate 201. Another means of moving backwardly the cam plate 207 to cause the separating trip motion of the plates 300 and 301, is shown in Figs. 1, 2 and 4, in which a lever 316 is attached to a stud 317 which at its other end is attached to a lever 318 which in turn at 319 is connected with a link or bar 320, which bar at its lower end passes through a guide hole at 321 of the base cross piece 21 supporting the uprights 11 and 13, the stud 319 being pivotally supported in extensions 322, 323 of the lens support 14. A normalizing coil spring 324 surrounds said stud 317 and is attached to the lens or to said stud, and bears with its other end 325 upon said lens support 14. The lower end of the rod 320, Fig. 1, at 326 is adapted, when the metal front is retarded into the camera case 1, to ride up on an inclined surface 327, Figs. 1 and 21, of a spring trip lever 328, which is pivoted at 329 to the bottom of the casing 1, substantially set forth in my said U. S. Letters Patent No. 1,362,833. When the rod 320 rides up on the incline 327 of said lever, the end of the lever 316 is forced into the path of and up against the roller 215 of the extension 214 of the cam plate 207, and gives a backward motion to said cam plate to cause its lugs as previously described to expand the surfaces of the plates 300 and 301. When the lens support with the rod 320 is again drawn forward the end of the said rod forces the incline 327 of the lever 316 out of its path, the lever again returning with its incline 327 to normal position behind said rod by the action of the return tension of its spring 340 indicated as bearing on a lug 341 at the heel of said lever to effect such return.

It will be seen by the foregoing that as the focal distance is so is the diaphragm aperture, and in general, except for moving objects, the shutter speed, so that if the lens support is brought forward to the indication on the focal scale for 100 ft. and over, the diaphragm will be set to the size aperture represented by the index number 16 therefor, and the shutter controlling lever will be moved forward to the index position 25 representing the position and tension for 1/25 second speed, and that consequently as the #16 diaphragm aperture is the smallest one usually employed for snap shots, so the shutter speed is the slowest used for snap shots. But 1/50 of a second many be made the normal slow speed for use with #16 diaphragm stop indication, if desired, by simply shaping the first step of the cam plate 207 to cause the lever 252 to move the required greater distance. The other increased speed settings of the shutter will be proportional to the increased apertures given to the diaphragm. I prefer to cause the diaphragm regulator to move in the first instance to #16 stop position, and the shutter regulator to 25, because 128, 64 and 32 of the diaphragm apertures and T and B of the shutter regulator pertain essentially to time exposures, and I provide the means in the construction shown to arbitrarily set by hand the regulators for such time conditions, and for any conditions and regulations that may be desired by the operator, different from those pertaining to ordinary amateur snap shot photography.

The term "lens controlling devices" hereinafter used means the diaphragm, shutter and focussing means.

Having now described my invention what I claim is:

1. A camera having a lens and a diaphragm, means to set the diaphragm automatically to various sized apertures according to the various focal positions of the lens, the said diaphragm setting means comprising a member having a plurality of surfaces disposed at various positions, and a movable member adapted to engage said surfaces and to movably engage said diaphragm, the positions of certain of the surfaces of said first member corresponding to the focal positions of the lens, and the position of certain other of the surfaces of said first member corresponding to the various aperture sizes of the diaphragm, the said surfaces comprising steps disposed along a body constituting said first member, the said member being secured to a part of the camera extension means.

2. A camera having a lens and a diaphragm, means to set the diaphragm automatically to various sized apertures according to the various focal positions of the lens, the said diaphragm setting means comprising a member having a plurality of surfaces disposed at various positions, and a movable member adapted to engage said surfaces and to movably engage said diaphragm, the positions of certain of the surfaces of said member corresponding to the focal positions of the lens, and the position of certain other of the surfaces of said first member corresponding to the various aperture sizes of the diaphragm, the said surfaces comprising steps disposed along a body constituting said first member, the said member being movably secured to a part of the camera extension means, and means to impart movement to said member to change the position of the surface of the said steps during the extension of the lens to focal position.

3. A camera having a lens and a diaphragm, means to set the diaphragm automatically to various sized apertures according to the various focal positions of the lens, the said diaphragm setting means comprising a member having a plurality of surfaces disposed at various positions, and a movable member adapted to engage said surfaces and to movably engage said diaphragm, the positions of certain of the surfaces of said first member corresponding to the focal positions of the lens, and the position of certain other of the surfaces of said first member corresponding to the various aperture sizes of the diaphragm, the said surfaces comprising steps disposed along a body constituting said first member, the said member being movably secured to a part of the camera extension means, and means to impart movement to said member to change the position of the surface of the said steps during the extension of the lens to focal position, the said moving means comprising projections disposed on said movable member opposite to and corresponding with certain of the steps disposed along said member, and an impinging device carried by a movable part of the camera and adapted to move against and move said movable member.

4. A camera having a lens and a diaphragm, means to set the diaphragm automatically to various sized apertures according to the various focal positions of the lens, the said diaphragm setting means comprising a member having a plurality of surfaces disposed at various positions, and a movable member adapted to engage said surfaces and to movably engage said diaphragm, the positions of certain of the surfaces of said first member corresponding to the focal positions of the lens, and the position of certain other of the surfaces of said first member corresponding to the various aperture sizes of the diaphragm, the said surfaces comprising steps disposed along a body constituting said first member, the said member being movably secured to a part of the camera extension means, and means to impart movement to said member to change the position of the surface of the steps during the extension of the lens to focal position, the said moving means comprising projections disposed on said movable member opposite to and corresponding with certain of the steps disposed along said member, and an impinging device carried by a movable part of the camera and adapted to move against and move said movable member, the said impinging device being adjustably secured to the camera.

5. A camera having a movable lens support, a rising front, a lens, a diaphragm, and means to regulate said diaphragm, means comprising a device to impart and to limit motion to set the diaphragm to various sized apertures according to the various focal positions of the lens, the said latter means comprising a member movably secured to the lens support and movably engaging the said diaphragm operating means, and comprising also surfaces disposed in certain and different positions, certain of the said surfaces corresponding to the various diaphragm apertures and certain thereof to the focal positions of the lens, and means to automatically lock said diaphragm setting device to hold said diaphragm at a set aperture during the elevation of said rising front, and means to release said lock upon the return of said rising front from an elevated position.

6. A camera having a movable lens support, a rising front, a lens, a diaphragm, and means to regulate said diaphragm, means comprising a device to impart and to limit motion to set the diaphragm to various sized apertures according to the various focal positions of the lens, the said latter means comprising a member movably secured to the lens support and movably engaging the said diaphragm operating means, and comprising also surfaces disposed in certain and different positions, certain of the said surfaces corresponding to the various diaphragm apertures and certain thereof to the focal positions of the lens, and means to automatically lock said diaphragm setting device to hold said diaphragm at a set aperture during the elevation of said rising front, and means to release said lock upon the return of said rising front from an elevated position, said locking means comprising a movable member disposed between the said diaphragm regulating device and a support of said rising front, and having operative relation to both thereof.

7. In a camera having a lens, a diaphragm, a diaphragm regulator and an index scale for the apertures of said diaphragm, one position of said regulator corresponding to a normal diaphragm opening, means to lock the said regulator adjacent any designation of said index scale, and means to automatically release and to return said regulator to said position, the return of said regulator adjusting the diaphragm to normal opening.

8. In a camera having a lens, a diaphragm, a diaphragm regulator and an index scale for the apertures of said diaphragm, one position of said regulator corresponding to a normal diaphragm opening, means to lock the said regulator adjacent any designation of said index scale, and means to automatically release and to return said regulator to said position, the return of said regulator adjusting the diaphragm to normal opening, the said means to return the said diaphragm to said opening comprising a spring connected with said diaphragm regulator, the said spring exerting a return tension on the regulator.

9. In a camera having a lens, a diaphragm, a diaphragm regulator and an index scale for the apertures of said diaphragm, one position of said regulator corresponding to a normal diaphragm opening, means to lock the said regulator adjacent any designation of said index scale, and means to automatically release and to return said regulator to said position, the return of said regulator adjusting the diaphragm to normal opening, the said diaphragm regulator locking device comprising lock members disposed along and adjacent to the designation of the said diaphragm aperture index scale, and corresponding therewith, and a movable member connected with said regulator, the said member being movable into and out of engagement with the lock members of the index scale.

10. In a camera having a lens, a diaphragm, a diaphragm regulator and an index scale for the apertures of said diaphragm, one position of said regulator corresponding to a normal diaphragm opening, means to lock the said regulator adjacent any designation of said index scale, and means to automatically release and to return said regulator to said position, the return of said regulator adjusting the diaphragm to normal opening, the said diaphragm regulator locking device comprising lock members disposed along and adjacent to the designation of the said diaphragm aperture index scale, and corresponding therewith, and a movable member connected with said regulator, the said member being movable into and out of engagement with the lock members of the index scale, the said lock members comprising a plate bearing said index scale and notches formed in said plate adjacent and corresponding to the indications of said index scale, and a movable body adapted to be moved into engagement with and to hold in said notches, and to be moved out of engagement therewith.

11. In a camera having a lens, a diaphragm, a diaphragm regulator and an index scale for the apertures of said diaphragm, one position of said regulator corresponding to a normal diaphragm opening, means to lock the said regulator adjacent any designation of said index scale, and means to automatically release and to return said regulator to said position, the return of said regulator adjusting the diaphragm to normal opening, the said diaphragm regulator locking device comprising lock members disposed along and adjacent to the designation of the said diaphragm aperture index scale and corresponding therewith, and a movable member connected with said regulator, the said member being movable into and out of engagement with the lock members of the index scale, the said lock members comprising a plate bearing said index scale and notches formed in said plate adjacent and corresponding to the indications of said index scale, and a movable body adapted to be moved into engagement with and to hold in said notches, the latter motion being automatically effected upon the closing movement of certain of the camera parts.

12. In a camera having a lens, a diaphragm, a diaphragm regulator and an index scale for the apertures of said diaphragm, one position of said regulator corresponding to a normal diaphragm opening, means to lock the said regulator adjacent any designation of said index scale, and means to automatically release and to return said regulator to said position, the return of said regulator adjusting the diaphragm to normal opening, the said diaphragm regulator locking device comprising lock members disposed along and adjacent to the designation of the said diaphragm aperture index scale and corresponding therewith, and a movable member connected with said regulator, the said member being movable into and out of engagement with the lock members of the index scale, the said lock members comprising a plate bearing said index scale and notches formed in said plate adjacent and corresponding to the indications of said index scale, and a movable body adapted to be moved into engagement with and to hold in said notches, the latter motion being automatically effected upon the closing movement of certain of the camera parts, a movable member having an even surface being disposed in relation to said index scale plate and said regulator movable member, and means whereby the said even surface automatically moves the said regulator movable member out of engagement with said notches.

13. In a camera having a lens support, a lens, a diaphragm, a diaphragm regulator and an index scale for the apertures of said diaphragm, one position of said regulator corresponding to a normal diaphragm opening, means to lock the said regulator opposite any designation of said index scale, and means to automatically release and to return said regulator to said position, the return of said regulator adjusting the diaphragm to normal opening, said return of the regulator and diaphragm being effected by the movement of certain other parts of the camera.

14. In a camera having a lens support, a lens, a diaphragm, a diaphragm regulator and an index scale for the apertures of said diaphragm, one position of said regulator corresponding to a normal diaphragm opening, means to lock the said regulator opposite any designation of said index scale, and means to automatically release and to return said regulator to said position, the return of said regulator adjusting the diaphragm to normal opening, said return of the regulator and diaphragm being effected by the movement of certain other parts of the camera, a movable body in engagement with said diaphragm regulator, and an actuator secured to said camera to control the movable body.

15. In a camera having a lens support, a lens, a diaphragm, a diaphragm regulator and an index scale for the apertures of said diaphragm, one position of said regulator corresponding to a normal diaphragm opening, means to lock the said regulator opposite any designation of said index scale, and means to automatically release and to return said regulator to said position, the return of said regulator adjusting the diaphragm to normal opening, said return of the regulator and diaphragm being effected by the movement of certain other parts of the camera, a movable body in engagement with said diaphragm regulator, and an actuator secured to said camera to control the movable body, the said movable body comprising a lever carried by said lens support, the said lever movably engaging said diaphragm regulator and controlled by said actuator.

16. A camera having a lens and a diaphragm, and means to set the diaphragm automatically to various sized apertures according to the various focal positions of the lens, and means to permit the diaphragm to be manually set to any desired aperture.

17. A camera having a lens and a diaphragm, and means to set the diaphragm automatically to various sized apertures according to the various focal positions of the lens, means to permit the diaphragm to be manually set to any desired aperture, and means whereby the diaphragm is again automatically engaged after being set by hand to be automatically again set to various sized apertures according to the various focal positions of the lens.

18. In a camera having a lens and means to focus same, a diaphragm, and means to vary the size of the apertures thereof, and a shutter and means to vary the speed thereof, a connection formed between said diaphragm and said shutter, and means cooperative with said connection and said focus means, whereby the movement of the lens to focal position sets the diaphragm to an aperture corresponding to such focal position, and sets the shutter to a speed corresponding approximately to the size of aperture of the diaphragm.

19. In a camera having a lens and means to focus same, a diaphragm, and means to vary the size of the apertures thereof, one condition of the diaphragm being normal, and a shutter and means to vary the speed thereof, one condition of the shutter being normal, a connection formed between said diaphragm and said shutter, means cooperative with said connection and said focus means, whereby the movement of the lens to focal position sets the diaphragm to an aperture corresponding to such focal position, and sets the shutter to a speed corresponding approximately to the size of aperture of the diaphragm, and means whereby the closing movement of the camera parts acts to return the diaphragm and the shutter to normal condition.

20. In a camera having a diaphragm and means to vary the size of the aperture thereof, and having a variable speed shutter, means comprising a movable body disposed between said diaphragm and said shutter, and means whereby the movement of said movable body with said diaphragm causes the setting of said shutter to various speed positions, the said movable body being thin in form and having a central opening surrounding the lens area.

21. In a camera having a diaphragm and means to vary the size of the aperture thereof and having a variable speed shutter, means comprising a movable body disposed between said diaphragm and said shutter, and means whereby the movement of said movable body with said diaphragm causes the setting of said shutter to various speed positions, the said movable body being thin in form and having a central opening surrounding the lens area, a casing for said diaphragm, the said movable body being positioned within said casing.

22. In a camera having a lens controlling device, a visible index scale disposed on the outside of the camera casing, a movable and actuating index member in connection with said index scale, said member having a normal position at a point of the index scale, and a flexible connection formed between said movable member and said lens controlling device to actuate the latter when in retarded or advanced position in the casing, the said index scale having graded designations indexing the functions of said lens control, and the said movable and actuating index member being movable to the various designations of said scale, and catch means whereby the said movable index member is detained in position at various points of said scale corresponding to said designations, means to release said movable index member and means to return it to said normal position.

23. In a camera having a lens controlling device, a visible index scale disposed on the outside of the camera casing, a movable and actuating index member in connection with said index scale, said member having a normal position at a point of the index scale, and a flexible connection formed between said movable member and said lens controlling device to actuate the latter when in retarded or advanced position in the casing, the said index scale having graded designations indexing the functions of said lens control, and the said movable and actuating index member being movable to the various designations of said scale, catch means whereby the said movable index member is detained in position at various points of said scale corresponding to said designations, and means to release said movable index member, and means to return it to said normal position, said normalizing means comprising a device disposed between said movable index member and certain other movable camera parts whereby the movement of such other camera parts actuates the said movable index member, to return to said normal position.

24. In a camera having a lens controlling device, a visible index scale disposed on the outside of the camera casing, a movable and actuating index member in connection with said index scale, said member having a normal position at a point of the index scale, and a flexible connection formed between said movable member and said lens controlling device to actuate the latter when in retarded or advanced position in the casing, the said index scale having graded designations indexing the functions of said lens control, and the said movable and actuating index member being movable to the various designations of said scale, catch means whereby the said movable index member is detained in position at various points of said scale corresponding to said designations, means to release said movable index member, and means to return it to said normal position, the said normalizing means comprising in part a bed, a movable lens support, brackets supporting said bed, and an intermediate movable body actuated by the return of the lens support to release said movable index member.

25. In a camera having a lens controlling device, a visible index scale disposed on the outside of the camera casing, a movable and actuating index member in connection with said index scale, said member having a normal position at a point of the index scale, and a flexible connection formed between said movable member and said lens controlling device to actuate the latter when in retarded or advanced position in the casing, the said index scale having graded designations indexing the functions of said lens control, and the said movable and actuating index member being movable to the various designations of said scale, catch means whereby the said movable index member is detained in position at various points of said scale corresponding to said designations, and means to release said movable index member, and means to return it to said normal position, the said normalizing means comprising in part a bed, a movable lens support, brackets supporting said bed, and an intermediate movable body actuated by the return of the lens support to release said movable index member, said intermediate movable body comprising a lever pivotally secured to the camera casing, and having engagement with said bracket to disengage the latter from said casing, and connecting with said movable index member to release the latter from its catch positions.

26. In a camera having a lens controlling device, a visible index scale disposed on the outside of the camera casing, a movable and actuating index member in connection with said index scale, said member having a normal position at a point of the index scale, and a flexible connection formed between said movable member and said lens controlling device to actuate the latter when in retarded or advanced position in the casing, the said index scale having graded designations indexing the functions of said lens control, and the said movable and actuating index member being movable to the various designations of said scale, catch means whereby the said movable index member is detained in position at various points of said scale corresponding to said designations, and means to release said movable index member, and means to return it to said normal position, the said normalizing means comprising in part a bed, a movable lens support, brackets supporting said bed, and an intermediate movable body actuated by the return of the lens support to release said movable index member, said intermediate movable body comprising a lever pivotally secured to the camera casing, and having engagement with said bracket to disengage the latter from said casing, and connecting with said movable index member to release the latter from its catch positions, the said intermediate movable body being actuated by the retarding movement of the lens support.

27. In a camera having a lens controlling device, a visible index scale disposed on the outside of the camera casing, a movable and actuating index member in connection with said index scale, and a flexible connection formed between said movable member and said lens controlling device to actuate the latter when in retarded or advanced position in the casing, said flexible connection comprising an attenuated flexurable metal body and a guide means therefor.

28. In a camera having a lens controlling device, a visible index scale disposed on the outside of the camera casing, a movable and actuating index member in connection with said index scale, and a flexible connection formed between said movable member and said lens controlling device to actuate the latter when in retarded or advanced position in the casing, said flexible connection comprising a flexible cable, and a tubular flexible casing therefor.

29. In exposure-devices for a photographic camera having an axially movable lens, the combination with adjustable mechanism for varying the amount of light admitted, automatic means for making a compensating adjustment of said mechanism, to increase the amount of light admitted as the lens is moved out in focusing.

30. In exposure-devices for a photographic camera having an axially movable lens, the combination with shutter-mechanism adjustable to vary the exposure-time diaphragm-mechanism adjustable to vary the lens aperture, and automatic means for making a compensating adjustment of one of said mechanisms as the lens is moved out in focusing.

31. In exposure devices for a photographic camera, the combination with a lens and an axially movable support therefor, of shutter-mechanism adjustable to vary the exposure-time, and automatic means for adjusting said mechanism to lengthen the exposure-time as the lens is moved out in focusing.

32. In exposure-devices for a photographic camera, the combination with a base, a lens, and a support therefor movable axially on said base, of shutter-mechanism carried by the support and adjustable to vary the exposure-time, a cam carried by the base, and an adjusting member connected with the shutter-mechanism and adapted to cooperate with the cam to adjust said mechanism and lengthen the exposure time as the lens is moved out in focusing.

33. In exposure-devices for a photographic camera, in combination, a lens, a shutter-mechanism adjustable to vary the exposure time, a diaphragm-mechanism adjustable to vary the working aperture of the lens, means connecting said mechanisms to cause adjustment of one to produce a compensating adjustment of the other, and automatic means acting to produce a compensating adjustment of one of said mechanisms independently of the other as the lens is moved out in focusing.

34. In exposure-devices for a photographic camera, in combination, a lens, shutter-mechanism adjustable to vary the exposure time, a diaphragm-mechanism adjustable to vary the working aperture of the lens, means connecting said mechanisms for causing adjustment of one to produce a compensating adjustment of the other, and automatic means associated with the shutter-mechanism to adjust the same and thereby lengthen exposure-time as the lens is moved out in focusing.

Signed at New York city, in the county of New York and State of New York, this 8th day of November, A. D. 1917.

CLYDE C. BALSTON.